United States Patent [19]

Bladh et al.

[11] Patent Number: 4,623,885
[45] Date of Patent: Nov. 18, 1986

[54] METHOD AND ARRANGEMENT FOR DISTRIBUTION OF SEND PERMISSION TO TERMINALS IN A TELECOMMUNICATION NETWORK

[75] Inventors: Eric A. Bladh, Täby; Lars Åke A. Lindholm, Enskede, both of Sweden

[73] Assignee: Telefonaktiebolaget LM Ericsson, Stockholm, Sweden

[21] Appl. No.: 456,028

[22] PCT Filed: May 6, 1982

[86] PCT No.: PCT/SE82/00153
§ 371 Date: Dec. 15, 1982
§ 102(e) Date: Dec. 15, 1982

[87] PCT Pub. No.: WO82/04145
PCT Pub. Date: Nov. 25, 1982

[30] Foreign Application Priority Data

May 14, 1981 [SE] Sweden .................... 8103041

[51] Int. Cl.$^4$ ............... H04Q 9/00; H04J 3/08
[52] U.S. Cl. ................. 340/825.005; 370/86
[58] Field of Search .......... 340/825.05, 825.5; 370/85, 86, 90

[56] References Cited

U.S. PATENT DOCUMENTS

| | | | |
|---|---|---|---|
| 3,593,290 | 7/1971 | Kerr | 340/825.05 |
| 3,985,962 | 10/1976 | Jones et al. | 370/90 |
| 4,387,425 | 6/1983 | El-Gohary | 370/85 |
| 4,393,497 | 7/1983 | Cantwell, Jr. | 340/825.05 |
| 4,410,985 | 10/1983 | Yasumoto et al. | 340/825.05 |

FOREIGN PATENT DOCUMENTS 2120055 11/1983 United Kingdom .................... 370/86

*Primary Examiner*—Donald J. Yusko
*Attorney, Agent, or Firm*—Roberts, Spiecens & Cohen

[57] ABSTRACT

An arrangment to distribute send permission to any of the terminals in a telecommunication network when transmitting information between terminals which are connected to each other through a common ring bus controlled by a computer being located in each of the terminals. On the ring bus a signal word frame (SP) of HDLC format is circulating. The frame which is sent from any of the terminals comprises a send permission word in the form of a specific signal pattern. When one or more of the terminals connected to the bus is in a determined logic condition, that terminal receives the send permission which is first to occupy said logic state in relation to the position of the send permission frame on the loop. As soon as one of the terminals has received the send permission it transmits an abortion pattern within the frame to the bus. The frame then becomes invalid and no other terminal can have the send permission. When a terminal has finished its information transmission it retransmits the send permission frame to the bus so that a send permission again is available to all the terminals. When a terminal has nothing to send the own terminal is aborted, and the circulating send permission is looped through the terminal back to the ring bus. An address comparison logic circuit (AL) receives all the frames on a first input and compares the address field in the received frames with a fixed address ($A_{CA}$) corresponding to the pattern of said send permission and generates upon equal addresses a control signal either to a first abortion generator (AG1) or a second abortion generator (AG2) depending on the logic signal state (CFR) of a second input. Said first abortion generator transmits, when activated, an abortion work (AB) within the frame to the bus. Said second abortion generator transmits, when activated, an abortion signal word (AB) within the frame towards the own terminal. A flag detection circuit (FL) detects the incoming data flow and transmits, for each received, complete flag signal pattern, a control signal to the address camparison circuit to start said comparison.

2 Claims, 4 Drawing Figures

4,623,885

METHOD AND ARRANGEMENT FOR DISTRIBUTION OF SEND PERMISSION TO TERMINALS IN A TELECOMMUNICATION NETWORK

TECHNICAL FIELD

The invention relates to a method and arrangement to distribute send permission to any of the terminals in a telecommunication network when transmitting information between terminals which are inter connected through a common ring bus and controlled by a computer located in each of the terminals.

BACKGROUND ART

An arrangement for the distribution of send or write permission to computers connected in a loop is described in an article by M. T. Liu and C. C. Reames, "The design of distributed computer network", Proc. Int. Computer Symp. 1975, Vol 1 pages 273-282. The article shows that by permitting a computer to send, i.e. to break the loop, on condition that no information frame is passing that moment, several terminals can send at the same time. Each computer is then prepared to receive incoming data, store the data in a buffer store and to return the data to the loop (Ref 1).

Another known device gives send permission by means of a special bit pattern. The bit pattern is converted or reshaped (retransmitted) depending on whether the send permission is accepted or refused. The device is presented in an article by W. D. Farmer and E. F. Newhall, Proc, ACM Symp. Probl. Optim. Data communication System 1-33, 1969 (Ref 2).

SUMMARY OF THE INVENTION

As has been shown above there are several different ways to administer the sending of data between computers connected to a ring bus. The problem with the arrangement according to Ref 1 is that it due to its complexity it also demands a complicated hardware.

The arrangement shown in Ref 2 results in a bad security in the transmission, since disturbances easily can give rise to send permission because the bit pattern is unguarded as it is not part of a standardized HDLC-frame (no FCS).

The arrangement according to the invention, which is characterized in accordance with the claims, solves such problem by having a send permission frame, (so called token frame) of HDLC-format (High Level Data Link Control) containing a send permission constituting a determined signal pattern, circulate on the ring bus. When a determined logic condition appears in any of the connected terminals indicating that the terminal wishes to send on the bus, send permission is given to that terminal which due to the position of the frame on the loop first occupies such determined condition by detecting the token frame in such first terminal. This terminal then places an abortion pattern in the token frame which is sent to the bus. Thus the contents of the frame will be invalid and distribution of the send permission to any of the other terminals impossible, as only one terminal at a time may send on the loop. The described process means that the token frame is received and aborted towards the bus if the terminal wishes to send, but is aborted towards the terminal and looped through the terminal if this terminal does not want to send.

BRIEF DESCRIPTION OF DRAWINGS

The arrangement according to the invention will be more fully described below by means of an embodiment with reference to the accompanying drawing in which FIGS. 1a–d schematically show a process in accordance with the arrangement according to the invention with a number of terminals connected to a common ring bus.

PREFERRED EMBODIMENT

Figure 1:
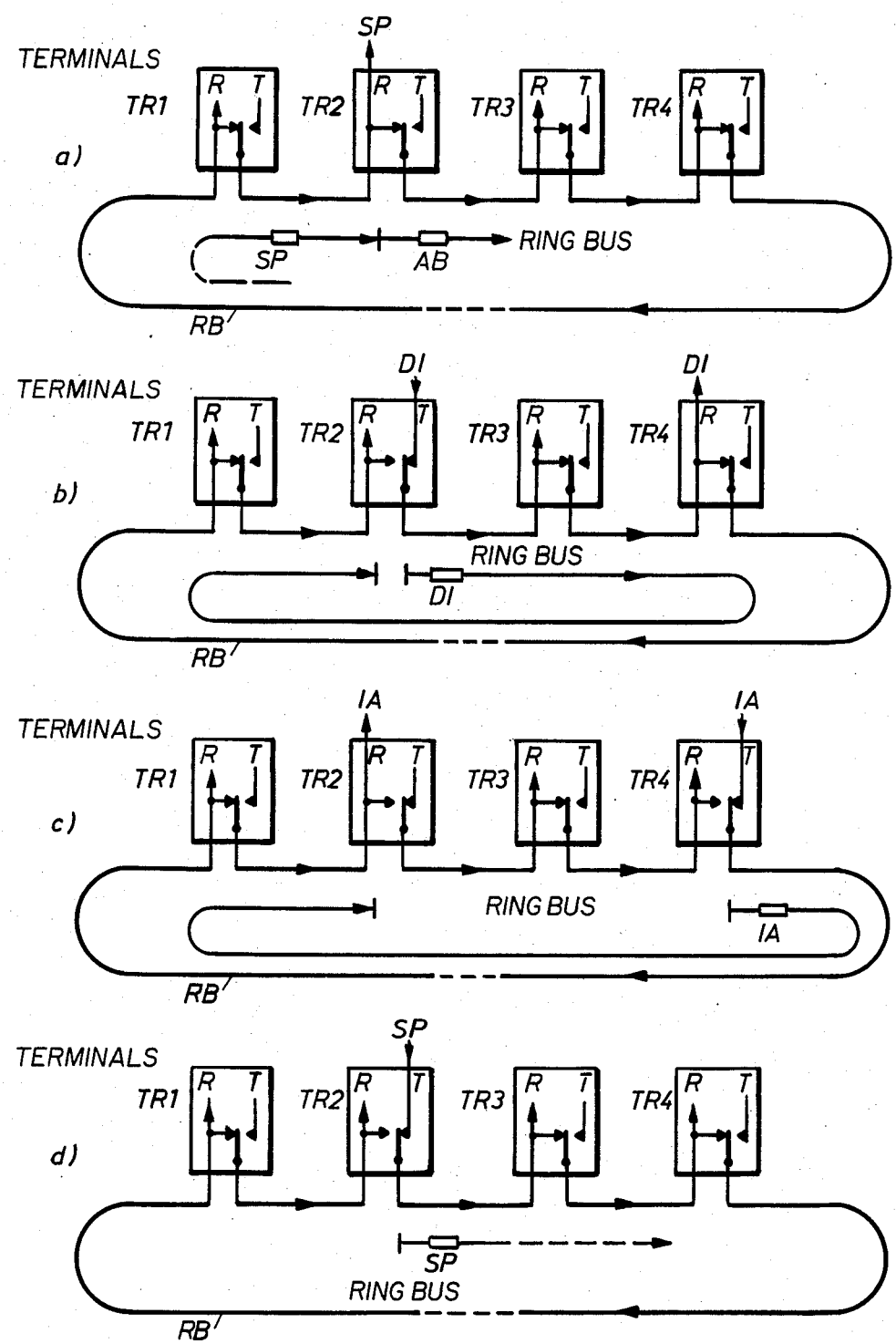

As shown in FIG. 1 four terminals TR1-TR4 are connected to a common serial ring bus RB. It is assumed that the terminal TR2 wants to send a message to the terminal TR4. A send permission frame (token frame) SP having a HDLC-format is circulating on the bus. As the terminal TR2 wants to send and thus needs a send permission, the send permission frame is received by the receiving part R of the terminal TR2. When the receiver recognizes the bit pattern of the token frame it knows that it has send permission and aborts the token frame towards the ring bus. The abortion means that an abortion pattern AB comprising 8 consecutive binary "ones" is included in the send permission frame and sent to the bus. The send permission frame is now destroyed and no other terminal can obtain a send permission as long as the terminal TR2 is sending. When the sending is finished the terminal TR2 hands over the send permission to the bus by sensing a new send permission frame that can be taken by any terminal. If a terminal does not want a send permission the frame is aborted towards the own terminal and the circulating send permission is looped through the terminal and returned to the bus again.

FIG. 1a illustrates how the circulating send permission frame SP is received by the terminal TR2 and that an abortion pattern AB is inserted in the frame for transmission to the ring bus.

FIG. 1b illustrates how the terminal TR2 after abortion towards the bus opens the loop and sends a message DI to the terminal TR4, which, as shown in FIG. 1c, after receiving the message, interrupts the loop momentarily and sends an acknowledgement frame IA to the terminal TR2 whereupon the loop through the terminal TR4 automatically is closed again.

FIG. 1d illustrates how the terminal TR2, when the transmission is finished, retransmits the original send permission frame on the ring bus, then the loop through the terminal TR2 is automatically closed. It may be observed that a freely circulating send permission frame presumes a total delay around the bus that exceeds the sending time of the frame.

Figure 2:
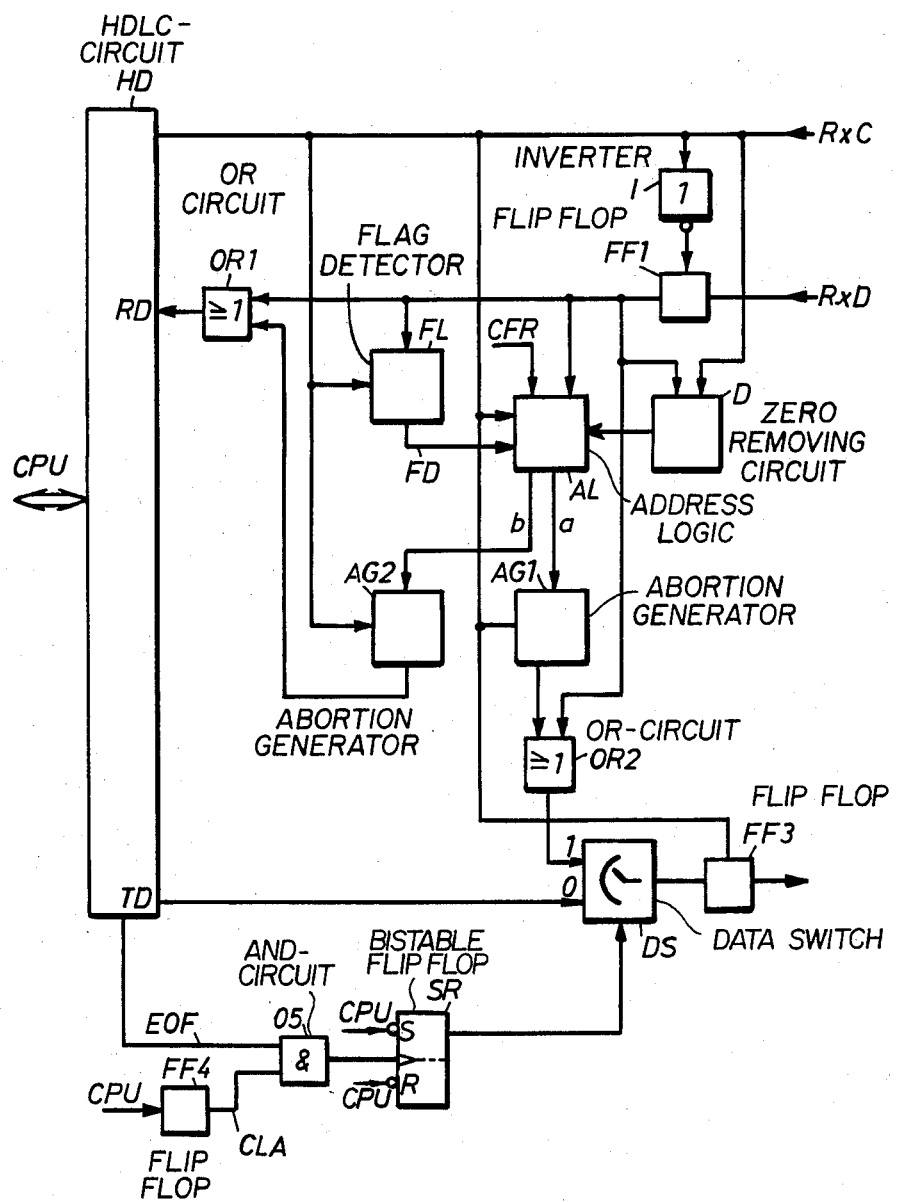
FIG. 2 is a block diagram of the arrangement in a terminal according to the invention.

FIG. 2 is a block diagram of the loop logic circuit included in each terminal. The loop logic unit receives the token frame from the bus or an input RxD (serial input) through an adaptation unit which is not shown. On one input a common clock signal RxC is received.

All information sent between the terminals through the ring bus is exchanged as HDLC frames having a format according to the ISO standard 3309. A special address combination called a conditional address indicates that the frame containing this special address combination is a send permission frame (token frame). In this standardized frame format the information content is always supervised regarding error security, by a check sum control FCS included in the frame (Frame Check Sequence).

A central processor CPU (not shown in the drawing) controls the information exchange between the terminal and the bus in a known manner. The processor is of a known type, for example MOTOROLA M68000.

A HDLC-circuit HD, for example MOTOROLA type M68354, serves as an adaptor between the processor CPU and the loop logic circuit. The HDLC circuit frees the processor of certain task by performing certain control functions itself. The control processor CPU and the HDLC-circuit can be considered a terminal processor.

A flag detecting logic FL is used to recognize the flag sequences within each frame received and in response thereto to send a control signal FD (Flag Detect) to an address logic circuit AL. The address logic AL compares the address of the incoming frame with a fixed token frame address, i.e. the address logic investigates whether the incoming frame is a send permission frame or not. When a send permission frame has been detected, i.e. when the addresses are equal, it is determined if an abortion signal shall be sent towards the bus or towards the terminal processor. The decision is based on the logic condition of a control signal CFR (Conditioned Frame Receive) sent from the processor CPU to the address logic AL. The value of the signal CFR providing such determined logical condition of each terminal, stating if the terminal wants to send or not. Thus the signal CFR determines if the received frame shall be aborted towards the terminal itself or towards the bus.

A first abortion generator AG1 generates an abortion signal to the bus when receiving an activation signal from the address logic.

A second abortion generator AG2 generates an abortion signal to the terminal processor (actually via OR-circuit OR1 and HDLC-circuit HD) when receiving an activation signal from the address logic.

A switching unit, a data switch DS, has the task to close or open the loop through the terminal. The unit DS has from the beginning the state closed loop, i.e. "loop".

A unit SR is a bistable flip-flop which under the control of pulses from the processor CPU controls the switching of the data switch DS.

According to the HDLC-protocol at the most 5 consecutive logic "ones" may appear in sequence in a message. In messages where more than 5 consecutive "ones" appear a "zero" is stuffed after the fifth "one", so called bit stuffing. However, within the loop logic the real message is treated with possible stuffed "zeros" removed. This takes place in a zero removing circuit D. This circuit is of no importance for the explanation of the invention why it is shown only to clarify the background and avoid misunderstanding. The circuit consists of a shift register having a gate circuit connected to the outputs.

A processor activated control signal CLA (Close Loop Automatically) can be used as clock signal for the flip-flop SR after each transmitted, completed frame from the terminal, to close the loop automatically. The processor CPU activates the signal CLA before the start of the transmission of that frame after which an automatic closure of the loop is wanted. The automatic loop closure takes place when a signal EOF (End Of Frame) appears and the signal CLA is active.

Referring to FIG. 2 a process is described below utilizing the device according to the invention.

The signal coming from the bus is fed to inputs of the address logic AL and inputs of the flag detect logic FL through a first logic flip-flop FF1 manufactured by Texas Instruments under the type 74LS74. The flip-flop receives clock signals through an inverter I. The message is also fed to a receiver input RD of the HDLC circuit HD through a first input of an OR-circuit OR1.

Figure 3:
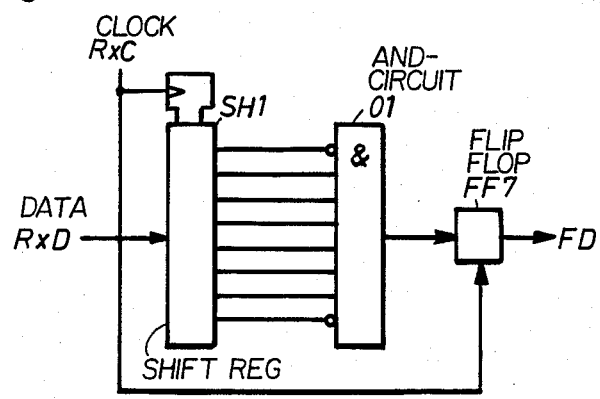
FIG. 3 is a block diagram of a flag detecting circuit FL which is part of the arrangement.

The flag detect logic comprises, according to FIG. 3, a shift register SH1 manufactured by Texas Instruments as type 74LS164 the outputs of which are connected to the 8 inputs of an AND-circuit 01 the output of which providing a flag detect signal FD via a flip-flop FF7 to the address logic AL when a word has been received on the inputs that defines a flag i.e. zero, six ones, zero (01111110).

Figure 4:
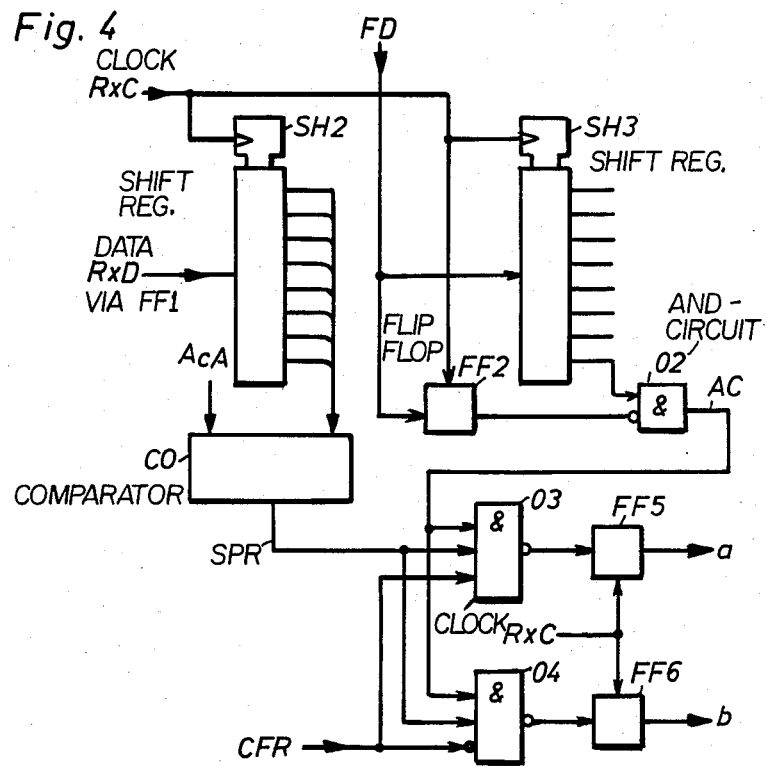
FIG. 4 is a block diagram of an address comparison logic AL which is part of the arrangement.

As appears from FIG. 4 the address logic AL comprises a shift register SH2 of the same type as the register SH1 and the inputs of which receive the incoming dataflow. Under the control of a clock signal RxC common to the loop logic, the message is shifted through the shift register SH2 the outputs of which are connected to the corresponding inputs of a comparator circuit CO containing two comparators manufactured by Texas Instruments as type 74LS85. Each 8-bit word from the shift register to the comparator CO is compared therein with a fixed 8-bit word having a bit pattern corresponding to the token frame address $A_{CA}$, i.e. the special bit pattern forming the send permission.

A further shift register SH3, of the same type as the registers SH1 and SH2 receives the flag detect pulse FD on the data input. This pulse informs the address logic that the reception of the address of the incoming message will just start. The flag detect pulse FD is stepped through the register SH3 synchronously with the incoming address bits in the register SH2, controlled by the common clock RxC.

The output of the shift register SH3 is connected to one input of an AND-circuit 02. The other input of said AND-circuit is inverting and receives the flag detect pulse FD through a second logic flip-flop FF2 of the same type as the flip-flop FF1. When the pulse FD is shifted out from the register SH3 and is fed to the input of the AND-circuit 02 both the inputs of the AND-circuit 02 are activated and an address control pulse AC is sent from the output of the circuit to a first input on each of two AND-circuits 03 and 04, respectively.

The address control pulse AC indicates that the address of the message is completed. If the comparator CO finds that the compared addresses are equal a send-permission-received signal is transmitted from the output of the comparator to a second input on each of the AND-circuits 03 and 04, respectively. A third input on each of the AND-circuits 03 and 04 receives the signal CFR initiated by the computer CPU, i.e. that signal which due to its logical condition determines if the abortion pattern shall be sent to the ring bus or to the terminal processor. One of these third inputs must be inverted according to the example the third input of the AND-circuit 04.

The signals from the AND-circuits 03 and 04 each activates an output flip-flop FF5 and FF6, respectively, the output signals of which are the alternative output signals from the address logic AL, which each controls an abortion generator AG1 and AG2, respectively, as soon as the send permission frame has been detected by the circuit AL. The abortion generators are identical and each comprises a 4-bit binary counter of type 74LS161 manufactured by Texas Instruments and their task is to generate the abortion pattern.

Two states are possible, the signal CRF could be active or not active. Assume that the CFR signal is not active which means that the own terminal has nothing to send. The send permission frame is then routed through the loop logic circuit of the terminal terminal and aborted towards the HDLC-circuit HD of the terminal processor. After a finished address comparison in the address logic AL an output b then sends an activation signal to the input of the abortion generator AG2 causing the latter to generate an abortion pattern of eight consecutive logical "ones". The "ones" are fed to a second input of the OR-circuit OR1 the first input of which, as described above, receives the send permission from the terminal input RxD. The frame normally consists of an 8-bit start flag, an 8-bit address, an 8-bit control field, a 16-bit frame control field FCS (check sum control) and and 8-bit stop flag. Through said OR-circuit OR1 the 8 consecutive "ones" of the abortion pattern are now inserted in the control field of the incoming frame. The frame will now be too short and unvalid according to the definitions of the HDLC protocol. The HDLC circuit thus rejects a frame aborted in this way and the information is not transferred to the processor CPU. If none of the terminals wants to send on the bus, the loop through each terminal is always closed, i.e. the data switch DS is in position 1. As the incoming frame is aborted towards the terminal processor and the generator AG1 is unactivated, the information is routed through an OR-circuit OR2, the data switch DS and a third logic flip-flop FF3 back to the bus in the direction towards the next downstream terminal.

An active signal CFR means that the terminal wants to send on the bus and the terminal will thus receive and keep the send permission. In this case the abortion generator AG2 is not activated by the address logic and no abortion pattern is sent towards the terminal. The HDLC circuit receives instead the incoming send permission frame passing it on to the processor which, after checking the correctness of the frame control field FCS, knows that it has received the send permission.

The address logic AL this time transmits an activation signal a to the abortion generator AG1 which, in the manner described earlier, feeds 8 consecutive "ones", i.e. an abortion pattern, in the control field of the frame through a second input of the OR-circuit OR2, the data switch DS and the flip-flop FF3 into the bus. The frame that now is sent to the bus contains the abortion pattern and is thus destroyed which means that no other terminal along the bus can have the send permission even if it want to, i.e. its signal CFR is active.

Before the terminal can start sending messages to the bus the loop must be opened, i.e. the data switch DS should be in the position 0 according to FIG. 2. This is initiated by the processor CPU which sends an activation pulse to the R input of the flip-flop SR which then sends a control signal to the data switch DS switching to the position corresponding to an open loop. Now information can be sent, under the control of the processor CPU, from the output TD on the HDLC circuit through the data switch DS, through the flip-flop FF3 to the bus and further on to another addressed terminal. The transmission from the terminal is finished by sending a new send permission frame to the bus as a sign that the terminal forwards the send permission to the next terminal which wants to send. Of course this may be the same terminal again depending on which terminal along the bus that first has the signal CFR active.

When the send permission frame is sent, the loop through the terminal is automatically closed again because the processor CPU before that has activated a fourth flip-flop FF4, sending a signal CLA to one of the inputs of an AND-circuit 05. The second input of the circuit 05 is activated by a signal EOF (End Of Frame) which is released from the HDLC circuit HD when the transmission of the frame is finished. The output from the AND-circuit 05 controls a clock input of the circuit SR which, when activated, send a positive signal from the data input to the output, such output signal causing the data switch DS to change its position so that the loop is closed again through the terminal which is now ready to monitor the bus until a new send permission is wanted.

The described embodiment only relates to the identifying of a determined conditional address corresponding to send permission but of course there are also other types of addresses in other frames, for example the self address of the terminal when some other terminal wishes to send a message or a global address addressing all terminals connected to the ring bus. The advantages of the arrangement according to the invention compared to known techniques are: Lower processor load, a good utilization of the bus, a simple hardware due to the fact that the information is transmitted in frames of the standardized HDLC format, which all together also mean lower costs.

What we claim is:

1. A telecommunications network utilizing HDLC format wherein a signal word frame includes a send permission byte in a particular byte position thereof comprising: a ring bus, through which at least said signal word frame circulates and a plurality of terminals connected to said ring bus, each of said terminals comprising a terminal processor which receives information from said ring bus and transmits information to said ring bus, said terminal processor indicating when desiring to transmit information and only transmitting information after receipt of a send permission byte, and a loop logic means interfacing said terminal processor with said ring bus, said loop logic means comprising:

means for retransmitting received signal word frames having an input connected to said ring bus, means for comparing the byte in said particular byte position of received signal word frames with a stored byte representing a send permission and upon equality emitting a send-permission-received signal, means responsive to said terminal processor and to the occurrence of said send-permission-received signal for generating a first control signal when said terminal processor desires to transmit information or for generating a second control signal when said terminal processor does not desire to send information, first abortion generator means responsive to said first control signal for changing the send permission byte in the received signal word frame to an innocuous byte during the retransmission of said frame to said ring bus, second abortion generator means responsive to said second control signal for changing the send permission byte in the received signal word to an innocuous byte during the transmission of said frame to said terminal processor, switching means having a first input connected to said terminal processor for receiving information therefrom, a second input connected to said means for retransmitting for receiving information therefrom and an output means connected to said ring bus for transmitting information thereto, and control means responsive to said terminal processor for controlling the state of said switch means.

2. The network of claim 1 wherein said control means includes means for controlling said switch means to always permit the passage of the signal word frame from said means for retransmitting.

* * * * *